United States Patent
Mizoguchi et al.

(10) Patent No.: US 7,729,847 B2
(45) Date of Patent: Jun. 1, 2010

(54) AIR-FUEL RATIO CONTROL DEVICE OF INTERNAL COMBUSTION ENGINE

(75) Inventors: Hiroaki Mizoguchi, Susono (JP); Takahiko Fujiwara, Susono (JP); Kunihiko Nakata, Mishima (JP); Kenji Sakurai, Gotenba (JP); Hiroki Ichinose, Fujinomiya (JP); Masaaki Kawai, Kakegawa (JP); Atsunori Hirata, Aki-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 374 days.

(21) Appl. No.: 11/913,697

(22) PCT Filed: Feb. 7, 2007

(86) PCT No.: PCT/JP2007/052549

§ 371 (c)(1),
(2), (4) Date: Nov. 6, 2007

(87) PCT Pub. No.: WO2007/091721

PCT Pub. Date: Aug. 16, 2007

(65) Prior Publication Data

US 2009/0301437 A1    Dec. 10, 2009

(30) Foreign Application Priority Data

Feb. 7, 2006    (JP) .............................. 2006-029535

(51) Int. Cl.
*G06F 19/00* (2006.01)
*F01N 3/20* (2006.01)

(52) U.S. Cl. ......................... 701/114; 701/102; 60/274; 60/285; 60/301

(58) Field of Classification Search ................. 701/101, 701/102, 103, 113, 114; 60/274, 277, 284, 60/285, 297, 299–302

See application file for complete search history.

(56) References Cited

U.S. PATENT DOCUMENTS

| 5,584,176 | A  | * | 12/1996 | Meyer et al. ................... 60/274 |
| 6,131,439 | A  | * | 10/2000 | Hamburg et al. ............... 60/276 |
| 6,499,294 | B1 | * | 12/2002 | Katoh et al. ................... 60/301 |
| 6,976,355 | B2 | * | 12/2005 | Imada et al. ................... 60/285 |
| 7,000,385 | B2 | * | 2/2006  | Miyashita ..................... 60/285 |
| 7,162,862 | B2 | * | 1/2007  | Nagai et al. ................... 60/285 |
| 7,305,820 | B2 | * | 12/2007 | Miyashita ..................... 60/301 |

FOREIGN PATENT DOCUMENTS

| EP | 1529944 A1 | * | 5/2005 |
| JP | 05010178 A | * | 1/1993 |
| JP | 09-096214 A |   | 4/1997 |
| JP | 09151759 A |   | 6/1997 |

(Continued)

*Primary Examiner*—Willis R Wolfe, Jr.
(74) *Attorney, Agent, or Firm*—Sughrue Mion, PLLC

(57) ABSTRACT

The combustion air-fuel ratio is made leaner than the stoichiometric air-fuel ratio at the time of engine startup and the combustion air-fuel ratio is made richer than the stoichiometric air-fuel ratio and the exhaust downstream part of the three-way catalyst apparatus is raised in temperature when it is judged that just the exhaust upstream part of the three-way catalyst apparatus arranged in the engine exhaust system has been raised to the catalyst activation temperature.

7 Claims, 3 Drawing Sheets

FOREIGN PATENT DOCUMENTS

| | | | |
|---|---|---|---|
| JP | 09222010 A | | 8/1997 |
| JP | 11013462 A | * | 1/1999 |
| JP | 2000257479 A | | 9/2000 |
| JP | 2001-050085 A | | 2/2001 |
| JP | 2001207834 A | | 8/2001 |
| JP | 2002332833 A | * | 11/2002 |
| JP | 2004324493 A | | 11/2004 |
| JP | 2004339967 A | | 12/2004 |
| JP | 2004346777 A | | 12/2004 |
| JP | 2005-188476 A | | 7/2005 |
| JP | 2005-264826 A | | 9/2005 |
| JP | 2006348753 A | * | 12/2006 |

* cited by examiner

EXHAUST GAS FLOW

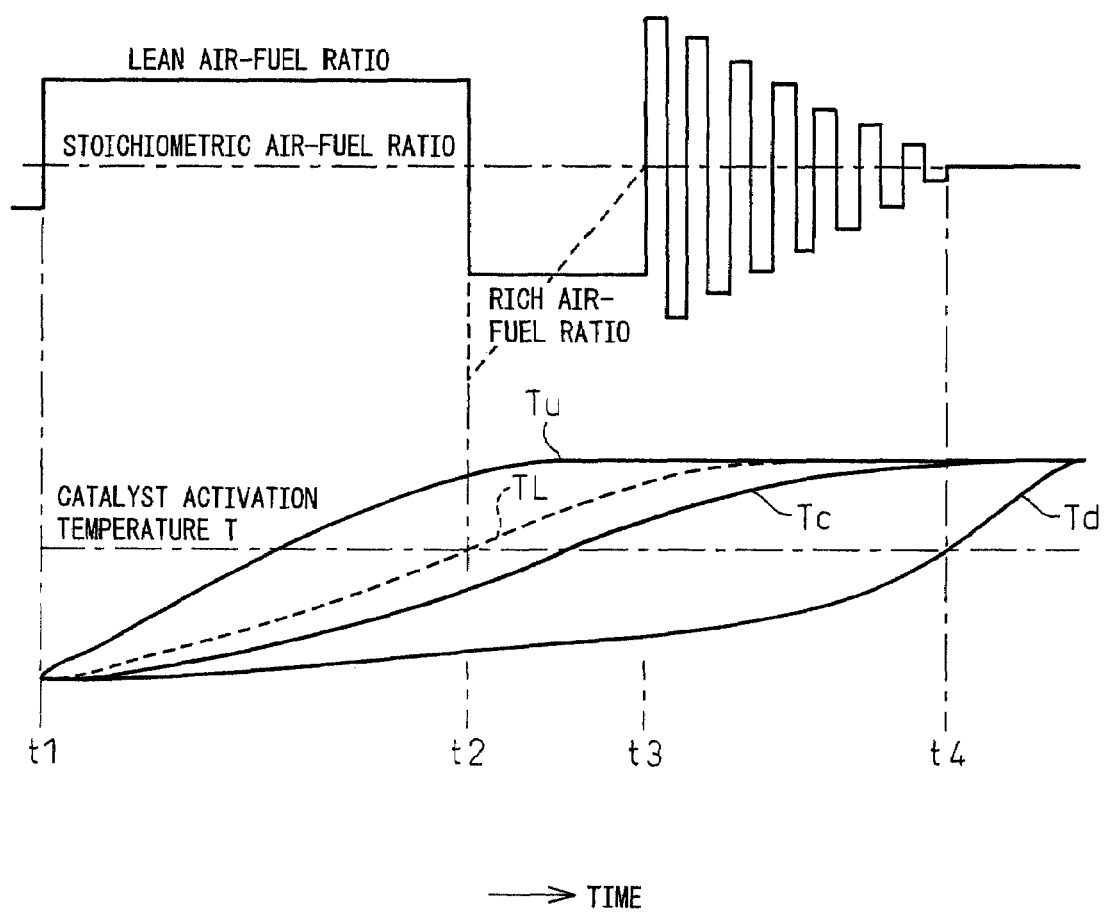

AIR-FUEL RATIO CONTROL DEVICE OF INTERNAL COMBUSTION ENGINE

CROSS REFERENCE TO RELATED APPLICATIONS

This application is a National Stage of International Application No. PCT/JP2007/052549 filed on Feb. 7, 2007, claiming priority based on Japanese Patent Application No. 2006-029535, filed Feb. 7, 2006, the contents of all of which are incorporated herein by reference in their entirety.

TECHNICAL FIELD

The present invention relates to an air-fuel ratio control device of an internal combustion engine.

BACKGROUND ART

The exhaust gas of an internal combustion engine contains NOx, CO, HC, etc. To purify the gas of these substances, the engine exhaust system is provided with a three-way catalyst apparatus. A three-way catalyst apparatus cannot purify the gas of these substances well before it is raised to the catalyst activation temperature, so at the time of engine startup where the catalyst temperature is low, the three-way catalyst apparatus has to be quickly raised to the catalyst activation temperature.

For this reason, it is proposed to make the combustion air-fuel ratio leaner than the stoichiometric air-fuel ratio right after engine startup so as to make the exhaust gas include a sufficient amount of oxygen and to utilize this oxygen to make the HC and CO etc. in the exhaust gas burn in the three-way catalyst apparatus. Further, it has been proposed that if the three-way catalyst apparatus is raised to the catalyst activation temperature, the combustion air-fuel ratio be made the stoichiometric air-fuel ratio, but when the fact that three-way catalyst apparatus is raised to the catalyst activation temperature is judged by the engine cooling water temperature reaching a set temperature, the set temperature be set lower the lower the engine cooling water temperature at the time of start of engine startup and the combustion air-fuel ratio be made lean regardless of the three-way catalyst apparatus as a whole being raised to the catalyst activation temperature and thereby the three-way catalyst apparatus be prevented from being excessively raised in temperature (for example, see Japanese Patent Publication (A) No. 9-151759, Japanese Patent Publication (A) No. 9-222010, Japanese Patent Publication (A) No. 2004-346777, and Japanese Patent Publication (A) No. 2004-324493).

In the above-mentioned background art, until the three-way catalyst apparatus as a whole becomes the catalyst activation temperature, the combustion air-fuel ratio is made lean, so while there is no problem when the cylinder temperature is low in the first half of the temperature rise, if the cylinder temperature becomes relatively high in the second half of the temperature rise, the exhaust gas will include a relatively large amount of NOx. This NOx ends up being released into the atmosphere without being sufficiently removed.

Therefore, an object of the present invention is to provide an air-fuel ratio control device of an internal combustion engine able to reduce the amount of NOx released into the atmosphere when quickly raising the three-way catalyst apparatus to the catalyst activation temperature right after engine startup.

DISCLOSURE OF THE INVENTION

An air-fuel ratio control device of an internal combustion engine as set forth in claim 1 according to the present invention 1 is characterized by making a combustion air-fuel ratio leaner than a stoichiometric air-fuel ratio at the time of engine startup and when it is judged that just an exhaust upstream part of a three-way catalyst apparatus arranged in an engine exhaust system has been raised to a catalyst activation temperature, making the combustion air-fuel ratio richer than the stoichiometric air-fuel ratio and raising a temperature of an exhaust downstream part of the three-way catalyst apparatus.

Further, an air-fuel ratio control device of an internal combustion engine as set forth in claim 2 according to the present invention provides an air-fuel ratio control device of an internal combustion engine as set forth in claim 1 characterized in that a volume of the exhaust upstream part of the three-way catalyst apparatus, which makes the combustion air-fuel ratio lean to raise it to the catalyst activation temperature, is changed to become larger the greater the amount of exhaust gas at the time of engine startup.

Further, an air-fuel ratio control device of an internal combustion engine as set forth in claim 3 according to the present invention provides an air-fuel ratio control device of an internal combustion engine as set forth in claim 1 or 2 characterized in that it is judged that just the exhaust upstream part has been raised to the catalyst activation temperature based on a measurement temperature of a center of the three-way catalyst apparatus in the longitudinal direction.

Further, an air-fuel ratio control device of an internal combustion engine as set forth in claim 4 according to the present invention provides an air-fuel ratio control device of an internal combustion engine as set forth in any one of claims 1 to 3 characterized in that when it is estimated that the $O_2$ storage amount of the three-way catalyst apparatus 1 is reduced to a set amount due to the combustion air-fuel ratio being made richer than the stoichiometric air-fuel ratio, the combustion air-fuel ratio is made the stoichiometric air-fuel ratio.

Further, an air-fuel ratio control device of an internal combustion engine as set forth in claim 5 according to the present invention provides an air-fuel ratio control device of an internal combustion engine as set forth in any one of claims 1 to 3 characterized in that when it is estimated that the $O_2$ storage amount of the three-way catalyst apparatus 1 is reduced to a set amount due to the combustion air-fuel ratio being made richer than the stoichiometric air-fuel ratio, the combustion air-fuel ratio is made to alternately fluctuate to the rich side and lean side from the stoichiometric air-fuel ratio.

Further, an air-fuel ratio control device of an internal combustion engine as set forth in claim 6 according to the present invention provides an air-fuel ratio control device of an internal combustion engine as set forth in claim 5 characterized in that an amplitude of the fluctuation of the combustion air-fuel ratio is made smaller the higher the temperature of the exhaust downstream part of the three-way catalyst apparatus.

Further, an air-fuel ratio control device of an internal combustion engine as set forth in claim 7 according to the present invention provides an air-fuel ratio control device of an internal combustion engine as set forth in claim 5 characterized in that a period of fluctuation of the combustion air-fuel ratio is made larger the higher the temperature of the exhaust downstream part of the three-way catalyst apparatus.

According to an air-fuel ratio control device of an internal combustion engine as set forth in claim 1 according to the present invention, at the time of engine startup, first the combustion air-fuel ratio is made leaner than the stoichiometric air-fuel ratio, the sufficient oxygen in the exhaust gas is used to burn the HC and CO in the exhaust gas in the three-way catalyst apparatus, and just the exhaust upstream part of the three-way catalyst apparatus arranged in the engine exhaust system is raised in temperature well. At this time, the cylinder temperature is low, so the combustion temperature is also low and not that much NOx is produced. If it is judged that just the exhaust upstream part of the three-way catalyst apparatus has been raised to the catalyst activation temperature, the combustion air-fuel ratio is made richer than the stoichiometric air-fuel ratio, so the cylinder temperature becomes relatively high. Even if the combustion temperature becomes high, not that much NOx is produced in the cylinders. Compared with when making the combustion air-fuel ratio lean, the amount of NOx released into the atmosphere can be reduced. By the combustion air-fuel ratio being made rich, the HC and CO in the exhaust gas increase, but due to the release of the oxygen stored in the three-way catalyst apparatus by the $O_2$ storage capacity while the combustion air-fuel ratio was made lean, these HC and CO are burned in the three-way catalyst apparatus and not released into the atmosphere. Further, this heat of combustion can be used to raise the temperature of the exhaust downstream part of the three-way catalyst apparatus better.

Further, according to an air-fuel ratio control device of an internal combustion engine as set forth in claim 2 according to the present invention, there is provided an air-fuel ratio control device of an internal combustion engine as set forth in claim 1 wherein the volume of the exhaust upstream part of the three-way catalyst apparatus, which makes the combustion air-fuel ratio lean to raise the catalyst activation temperature, is changed to become greater the greater the amount of exhaust gas at the time of engine startup. Just the volume of the three-way catalyst apparatus required for purifying the exhaust gas at the time of engine startup is raised quickly to the catalyst activation temperature due to it being quickly raised in temperature due to the leanness of the combustion air-fuel ratio.

Further, according to an air-fuel ratio control device of an internal combustion engine as set forth in claim 3 according to the present invention, there is provided an air-fuel ratio control device of an internal combustion engine as set forth in claim 1 or 2 wherein at least the temperature at the center of the three-way catalyst apparatus in the longitudinal direction is measured by a temperature sensor etc. It is judged based on this measurement temperature that just the exhaust upstream part of the three-way catalyst apparatus has been raised to the catalyst activation temperature. The temperature of the three-way catalyst apparatus is highest at the exhaust upstream end and lowest at the exhaust downstream end, so if at least the temperature of the center in the longitudinal direction is measured, it is possible to easily judge if just the exhaust upstream part has been raised to the catalyst activation temperature.

Further, according to an air-fuel ratio control device of an internal combustion engine as set forth in claim 4 according to the present invention, there is provided an air-fuel ratio control device of an internal combustion engine as set forth in any one of claims 1 to 3 wherein when it is estimated that the $O_2$ storage amount of the three-way catalyst apparatus 1 has been reduced to a set amount due to the combustion air-fuel ratio being made richer than the stoichiometric air-fuel ratio, the combustion air-fuel ratio is made the stoichiometric air-fuel ratio. Due to operation with the combustion air-fuel ratio made lean, the $O_2$ storage amount of the three-way catalyst apparatus 1 becomes the maximum storage amount. With this, in operation at the stoichiometric air-fuel ratio after the three-way catalyst apparatus as a whole has been raised to the catalyst activation temperature, the NOx ends up not being sufficiently removed when the combustion air-fuel ratio deviates to the lean side. Further, if the combustion air-fuel ratio is made and continued rich, the $O_2$ storage amount of the three-way catalyst apparatus 1 finally becomes zero. With this, in operation at the stoichiometric air-fuel ratio after the three-way catalyst apparatus as a whole has been raised to the catalyst activation temperature, the HC and CO end up being insufficiently removed when the combustion air-fuel ratio deviates to the rich side.

Due to this, when the combustion air-fuel ratio is made rich and it is estimated that the $O_2$ storage amount of the three-way catalyst apparatus 1 has been reduced to the set amount, preferably to about half of the maximum storage amount, the combustion air-fuel ratio is made the stoichiometric air-fuel ratio and the $O_2$ storage amount is maintained at the set amount. At this time, the three-way catalyst apparatus can become the catalyst activation temperature over a broad range from the exhaust upstream part, the HC, CO, and NOx contained in the exhaust gas of the stoichiometric air-fuel ratio can be removed well, and the heat of reaction generated at that time can be used to raise the remaining part of the three-way catalyst apparatus to the catalyst activation temperature.

Further, according to an air-fuel ratio control device of an internal combustion engine as set forth in claim 5 according to the present invention, there is provided an air-fuel ratio control device of an internal combustion engine as set forth in any one of claims 1 to 3 wherein when it is estimated that the $O_2$ storage amount of the three-way catalyst apparatus 1 has been reduced to a set amount due to the combustion air-fuel ratio being made richer than the stoichiometric air-fuel ratio, the combustion air-fuel ratio is made to alternately fluctuate to the rich side and lean side from the stoichiometric air-fuel ratio. If the combustion air-fuel ratio is made to fluctuate to the rich side and lean side from the stoichiometric air-fuel ratio, the three-way catalyst apparatus is alternately supplied with relatively large amounts of HC and CO and large amounts of oxygen and NOx. Due to this, relatively large amounts of HC and CO can be burned by the oxygen released from the three-way catalyst apparatus. This heat of combustion can be used to efficiently raise the temperature of the remaining part of the three-way catalyst apparatus not raised to the catalyst activation temperature. The same amount of oxygen as the released oxygen is again stored in the three-way catalyst apparatus, so the $O_2$ storage amount of the three-way catalyst apparatus 1 can be maintained at a set amount.

Further, according to an air-fuel ratio control device of an internal combustion engine as set forth in claim 6 according to the present invention, there is provided an air-fuel ratio control device of an internal combustion engine as set forth in claim 5 wherein the amplitude of the fluctuation of the combustion air-fuel ratio is made smaller to reduce the amounts of HC and CO and amounts of oxygen and NOx supplied to the three-way catalyst apparatus per unit time the higher the measurement temperature of the exhaust downstream part of the three-way catalyst apparatus and the remaining part of the three-way catalyst apparatus not raised to the catalyst activation temperature due to the heat of combustion of the HC and CO being reduced is raised in temperature. Due to this, more than the necessary heat of combustion being generated and the exhaust upstream part of the three-way catalyst apparatus already raised to the catalyst activation temperature being excessively raised in temperature are also suppressed.

Further, according to an air-fuel ratio control device of an internal combustion engine as set forth in claim 7 according to the present invention, there is provided an air-fuel ratio control device of an internal combustion engine as set forth in claim 5 wherein the period of fluctuation of the combustion air-fuel ratio is made larger the higher the measurement temperature of the exhaust downstream part of the three-way catalyst apparatus to reduce the amounts of HC and CO and the amounts of oxygen and NOx supplied per unit time to the three-way catalyst apparatus and the remaining part of the three-way catalyst apparatus not raised in catalyst activation temperature due to the heats of combustion of the HC and CO being reduced. Due to this, more than the necessary heat of combustion being generated and the exhaust upstream part of the three-way catalyst apparatus already raised to the catalyst activation temperature being excessively raised in temperature are also suppressed.

BRIEF DESCRIPTION OF THE DRAWINGS

FIG. 3 is a time chart showing the change of the air-fuel ratio due to the air-fuel ratio control at the time of startup of FIG. 2 and the change of the temperature of the different parts of the three-way catalyst.

BEST MODE FOR CARRYING OUT THE INVENTION

Figure 1:
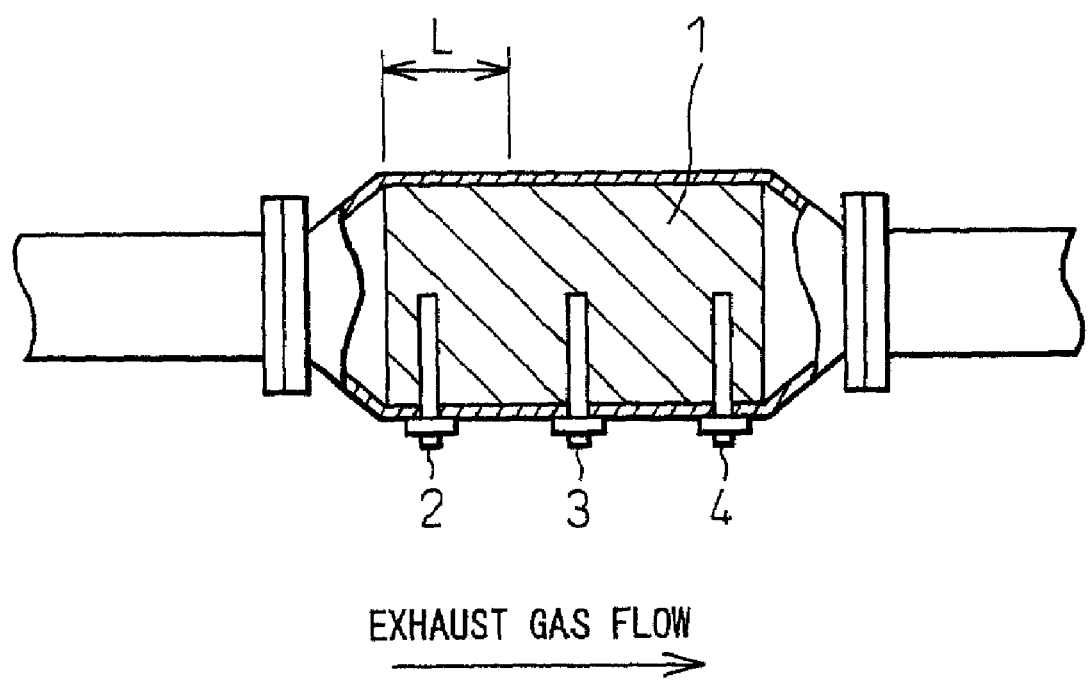
FIG. 1 is a schematic view showing part of the engine exhaust system.

FIG. 1 is a schematic view showing part of the engine exhaust system. In the figure, 1 indicates a three-way catalyst apparatus, 2 a first temperature sensor for detecting the temperature near the exhaust upstream end of the three-way catalyst apparatus 1, 3 a second temperature sensor for detecting the temperature at the center of the three-way catalyst apparatus 1 in the longitudinal direction, and 4 a third temperature sensor for detecting the temperature near the exhaust downstream end of the three-way catalyst apparatus 1. The first temperature sensor 2, second temperature sensor 3, and third temperature sensor 4 respectively detect the temperatures near the diametric center at different positions in the longitudinal direction in the present embodiment.

The three-way catalyst apparatus 1 removes the NOx, CO, and HC in the exhaust gas well when the air-fuel ratio of the exhaust gas is near the stoichiometric air-fuel ratio. However, it is difficult to continuously maintain the air-fuel ratio of the exhaust gas near the stoichiometric air-fuel ratio. By making the three-way catalyst apparatus 1 carry ceria etc. to give it an $O_2$ storage capacity, absorbing excess oxygen when the air-fuel ratio of the exhaust gas is lean, and release the absorbed oxygen when the air-fuel ratio of the exhaust gas is rich, it is possible to make the atmosphere in the three-way catalyst apparatus 1 near the stoichiometric air-fuel ratio regardless of the air-fuel ratio of the exhaust gas.

However, the three-way catalyst apparatus 1 can remove the NOx, CO, and HC in the exhaust gas near the stoichiometric air-fuel ratio well before reaching the catalyst activation temperature. Due to this, at the time of engine startup where the catalyst temperature is low, it is necessary to raise the three-way catalyst apparatus 1 quickly to the catalyst activation temperature. For this reason, the general practice has been to make the combustion air-fuel ratio leaner than the stoichiometric air-fuel ratio at the time of engine startup to make the exhaust gas contain a large amount of oxygen, to use this oxygen to burn the HC and CO in the exhaust gas well in the three-way catalyst apparatus 1, and to use this heat of combustion to raise the temperature of the three-way catalyst apparatus 1.

When making the combustion air-fuel ratio lean to raise the temperature of the three-way catalyst apparatus 1 in this way, in the first half of the temperature rise, the cylinder temperature is low and the combustion temperature also becomes low, so even if making the combustion air-fuel ratio lean, not that large an amount of NOx is produced. However, in the second half of the temperature rise, if the cylinder temperature becomes relatively high and the combustion temperature rises, with operation under a lean combustion air-fuel ratio, a relatively large amount of NOx is produced. This NOx cannot be removed well and ends up being released into the atmosphere when the three-way catalyst apparatus 1 is not sufficiently raised in temperature and the $O_2$ storage amount of the three-way catalyst apparatus 1 reaches the maximum storage amount due to operation under a lean air-fuel ratio up to now.

Figure 2:
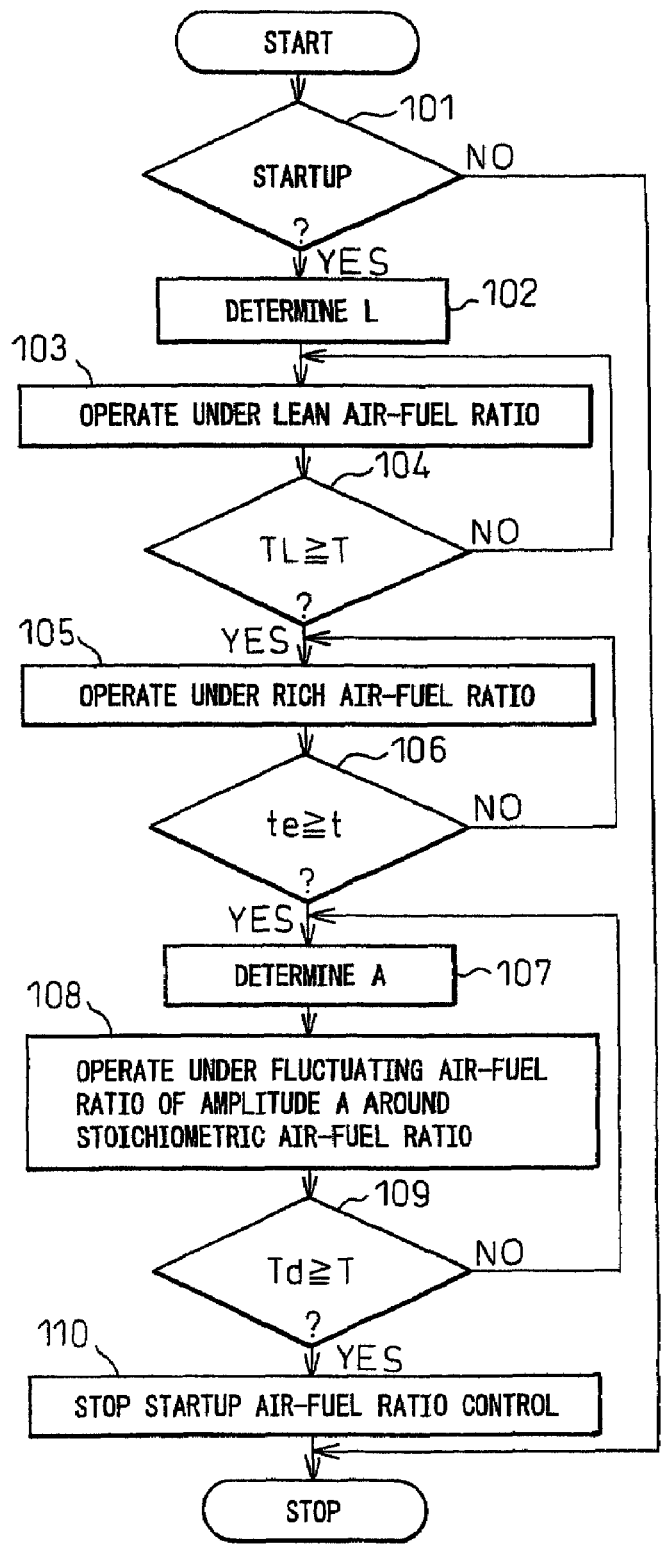
FIG. 2 is a flow chart for control of the air-fuel ratio at the time of startup performed by the air-fuel ratio control device of the present invention.

In the air-fuel ratio control device of an internal combustion engine according to the present invention, the combustion air-fuel ratio is controlled in accordance with the flow chart shown in FIG. 2 to raise the three-way catalyst apparatus 1 quickly to the catalyst activation temperature and suppress the amount of NOx released into the atmosphere at that time.

First, at step 101, it is judged if the engine is starting up by an on signal of a starter switch etc. When this judgment is negative, the routine ends as it is, but when this judgment is positive, the routine proceeds to step 102. At step 102, the volume of the exhaust upstream part of the three-way catalyst apparatus 1 required for purifying the amount of exhaust gas at the time of engine startup corresponding to the amount of intake air at the time of engine startup, preferably the amount of intake air at the time of a steady state operation right after the cylinders have finished starting firing and the engine speed rises to a set speed (below, "right after completion of engine startup") is determined. The larger the amount of exhaust gas right after the completion of engine startup, the greater the volume of the exhaust upstream part of the three-way catalyst apparatus 1 required. This volume is for example determined as the length L from the exhaust upstream end in a three-way catalyst apparatus having a uniform diameter.

Next, at step 103, the engine is operated under a lean air-fuel ratio (for example, 15 to 16). The combustion air-fuel ratio may be made lean from the cranking, but until the completion of engine startup, to secure a reliable starting ability, the combustion air-fuel ratio is preferably made the stoichiometric air-fuel ratio or rich air-fuel ratio. The operation under a lean air-fuel ratio is preferably started right after the completion of engine startup.

Next, at step 104, it is judged if the temperature TL near the diametrical center at the position of the length L from the exhaust upstream end of the three-way catalyst apparatus 1 has reached the catalyst activation temperature T. Until the overall apparatus has reached the catalyst activation temperature, the three-way catalyst apparatus 1 has a temperature gradient where the temperature gradually becomes lower from the exhaust upstream end to the exhaust downstream end. In the present embodiment, a temperature Tu near the exhaust upstream end is monitored by the first temperature sensor 2, a temperature Tc near the center of the longitudinal direction is monitored by the second temperature sensor 3, and a temperature Td near the exhaust downstream end is monitored by the third temperature sensor 4. Based on these three temperatures Tu, Tc, and Td, it is possible to estimate the temperature TL at the position of a length L from the exhaust upstream end.

Of course, when the amount of exhaust gas right after completion of engine startup is large or is small, the volume of the three-way catalyst apparatus required for purification is adjusted. Along with this, the length L from the exhaust upstream end is adjusted. No matter what the length L, the temperature TL at this length position can be estimated based on the above-mentioned three temperatures Tu, Tc, and Td. Further, if at least the temperature Tc of the center of the three-way catalyst apparatus 1 in the longitudinal direction is monitored, the temperature of the exhaust upstream end may be deemed the temperature of the exhaust gas flowing into the three-way catalyst apparatus 1 and the temperature TL at the position of the length L from the exhaust upstream end may be estimated.

When the judgment at step 104 is negative, that is, when the temperature TL near the diametrical center at the position of the length L from the exhaust upstream end of the three-way catalyst apparatus 1 is less than the catalyst activation temperature T and the volume of the exhaust upstream part of the three-way catalyst apparatus required for purifying the amount of exhaust gas right after completion of engine startup has not been raised to the catalyst activation temperature, at step 103, the engine is operated under a lean air-fuel ratio so as to make the exhaust gas contain a sufficient amount of oxygen, whereby the HC and CO in the exhaust gas are burned well in the three-way catalyst apparatus 1 and this heat of combustion is used to raise the temperature of the three-way catalyst apparatus 1 well. Right after the completion of the engine startup, the temperature inside the cylinder is still low. The combustion temperature is also low, so even if the combustion air-fuel ratio is made lean, not that much NOx is produced. In this way, NOx is released into the atmosphere without being purified from the gas that much in the three-way catalyst apparatus, but the amount of the NOx released is slight.

On the other hand, when the volume of the exhaust upstream part of the three-way catalyst apparatus required for purifying the amount of exhaust gas right after completion of engine startup has been raised to the catalyst activation temperature and the judgment at step 104 is positive, at step 105, the engine is operated under a rich air-fuel ratio (for example, 12 to 14) and the combustion air-fuel ratio is switched from a lean air-fuel ratio to a rich air-fuel ratio. At this time, the exhaust upstream part of the three-way catalyst apparatus 1 is raised to the catalyst activation temperature. Even if the combustion air-fuel ratio is made the stoichiometric air-fuel ratio, the exhaust gas can be purified well right after the completion of engine startup. However, the exhaust downstream part other than the exhaust upstream part of the three-way catalyst apparatus 1 is still not raised to the catalyst activation temperature. In preparation for an increase in the amount of exhaust gas, it is necessary to quickly raise the exhaust downstream part to the catalyst activation temperature.

Due to this, in the present embodiment, the combustion air-fuel ratio is made rich and relatively large amounts of HC and CO are made to flow into the three-way catalyst apparatus 1. These HC and CO are burned well in the three-way catalyst apparatus 1 since oxygen stored by the $O_2$ storage capacity of the three-way catalyst apparatus 1 at the time of a lean air-fuel ratio operation is released from the three-way catalyst apparatus 1. The exhaust downstream part of the three-way catalyst apparatus 1 can therefore be raised in temperature well.

When the combustion air-fuel ratio is switched from lean to rich, the temperature inside the cylinder is raised by the operation under the lean air-fuel ratio up until then. If the engine continues to be operated under the lean air-fuel ratio as it is, the combustion temperature would also become higher and the amount of production of NOx would end up becoming relatively large. However, in the present embodiment, at this time, the engine is operated under a rich air-fuel ratio, so even if the temperature inside the cylinder becomes high, not that much NOx will be produced. Even if the NOx is not removed in the three-way catalyst apparatus 1, the amount of NOx released into the atmosphere is slight.

The $O_2$ storage amount of the three-way catalyst apparatus 1, as explained above, is for maintaining the air-fuel ratio of the exhaust gas in the three-way catalyst apparatus 1 near the stoichiometric air-fuel ratio even when the combustion air-fuel ratio fluctuates to rich or lean. The $O_2$ storage amount of the three-way catalyst apparatus 1 is preferably about half of the maximum storage amount so that the combustion air-fuel ratio may fluctuate to rich and lean. If leaving the combustion air-fuel ratio rich, the exhaust downstream part of the three-way catalyst apparatus 1 is raised in temperature well, but the oxygen stored up to the maximum storage amount at the time of operation under a lean air-fuel ratio ends up being completely released.

In this flow chart, at step 106, it is judged if the time te elapsed from the start of operation under a rich air-fuel ratio has reached a set time t. At the start of operation under a rich air-fuel ratio, due to the previous operation under a lean air-fuel ratio, the three-way catalyst apparatus 1 stores the maximum storage amount of oxygen. This maximum storage amount is a value known for each three-way catalyst apparatus 1. The amount of HC and amount of CO required for halving the maximum storage amount of oxygen are also known. Due to this, the operating time t under a rich air-fuel ratio required for these amount of HC and amount of CO to flow into the three-way catalyst apparatus 1 can be set based on the value of the rich air-fuel ratio.

In this way, while the judgment at step 106 is negative, the engine is operated under a rich air-fuel ratio. On the other hand, when the time te elapsed from the start of operation under a rich air-fuel ratio has reached the set time t, if the $O_2$ storage amount of the three-way catalyst apparatus 1 becomes half of the maximum storage amount, the operation under a rich air-fuel ratio ends and the routine proceeds to step 107.

When the $O_2$ storage amount of the three-way catalyst apparatus 1 becomes about half of the maximum storage amount, it is also possible to switch the combustion air-fuel ratio from rich to the stoichiometric air-fuel ratio and, at the exhaust downstream part of the three-way catalyst apparatus, raise the temperature of the remaining part still not raised to the catalyst activation temperature using the heat generated when removing the HC, CO, and NOx. Even in such an operation under a stoichiometric air-fuel ratio, the $O_2$ storage amount of the three-way catalyst apparatus 1 can be maintained at about half of the maximum storage amount.

However, in the present embodiment, to quickly raise this remaining part to the catalyst activation temperature, the combustion air-fuel ratio is made to fluctuate to the rich side and lean side from the stoichiometric air-fuel ratio, the relatively large amounts of HC and CO when the combustion air-fuel ratio fluctuates to the rich side are made to flow into the three-way catalyst apparatus 1, and these HC and CO are burned by the oxygen released from the three-way catalyst apparatus. When the combustion air-fuel ratio fluctuates to the lean side, the amount of oxygen released for burning the HC and CO is stored again in the three-way catalyst apparatus 1. In this way, even if the combustion air-fuel ratio fluctuates, the $O_2$ storage amount of the three-way catalyst apparatus 1 can be maintained at about half of the maximum $O_2$ storage amount.

In the present embodiment, at step 107, the amplitude A of the fluctuation of the combustion air-fuel ratio is determined. The larger the amplitude A, the greater the amount of HC and amount of CO supplied to the three-way catalyst apparatus 1 and the more advantageous for raising the temperature of the remaining part not raised to the catalyst activation temperature of the three-way catalyst apparatus 1. However, the exhaust upstream part etc. of the three-way catalyst apparatus 1 already raised to the catalyst activation temperature is easily raised excessively. Due to this, the higher the temperature Td of the exhaust downstream end of the three-way catalyst apparatus 1 detected by the third temperature sensor 4 or estimated from the temperature Tc of the center part of the longitudinal direction of the three-way catalyst apparatus 1 detected by at least the second temperature sensor 3, the smaller the amplitude A is made. Due to this, the exhaust upstream part etc. of the three-way catalyst apparatus 1 already raised to the catalyst activation temperature is kept from being excessively raised in temperature.

At step 107, if the amplitude A of the fluctuation of the combustion air-fuel ratio is determined, at step 108, the engine is operated under a fluctuating air-fuel ratio of the amplitude A from the stoichiometric air-fuel ratio. Next, at step 109, in the same way as above, it is judged if the detected or estimated temperature Td of the exhaust downstream end of the three-way catalyst apparatus 1 has reached the catalyst activation temperature T. While this judgment is negative, at step 107, the amplitude A is determined and, at step 108, the engine is operated under a fluctuating air-fuel ratio.

At step 107, the amplitude A of the fluctuating air-fuel ratio operation was changed, but it is also possible to make the period of fluctuation of the fluctuating air-fuel ratio operation longer the higher the temperature Td of the exhaust downstream end of the three-way catalyst apparatus 1 and reduce the amount of CO and amount of HC supplied to the three-way catalyst apparatus. Due to this, the exhaust upstream part etc. of the three-way catalyst apparatus 1 already raised to the catalyst activation temperature are kept from being excessively raised in temperature.

When the detected or estimated temperature Td of the exhaust downstream end of the three-way catalyst apparatus 1 reaches the catalyst activation temperature T, all of the three-way catalyst apparatus 1 is raised to the catalyst activation temperature T, operation under a fluctuating air-fuel ratio becomes no longer necessary and, at step 110, the air-fuel ratio control at the time of startup is suspended.

FIG. 3 is a time chart showing the change in combustion air-fuel ratio at the time of the above-mentioned startup and the change in temperature at the different parts of the three-way catalyst apparatus 1. In this time chart, at the time t1 right after the completion of engine startup, the combustion air-fuel ratio is made lean and the temperature of the exhaust upstream part of the three-way catalyst apparatus 1 is raised. At the time t2, the temperature TL at the position of the length L in the longitudinal direction from the exhaust upstream end serving as the boundary of the exhaust upstream part of the three-way catalyst apparatus 1 reaches the catalyst activation temperature T, so from this time t2, the combustion air-fuel ratio is made rich to suppress the amount of production of NOx in the cylinders and the exhaust downstream part of the three-way catalyst apparatus 1 is made to rise in temperature well.

When the set time elapses and the time t3 is reached, the maximum $O_2$ storage amount of oxygen stored in is the three-way catalyst apparatus 1 at the time of a lean air-fuel ratio operation is reduced to about half by the rich air-fuel ratio operation. From this time t3, the engine is operated to make the combustion air-fuel ratio alternately fluctuate to the rich side and lean side from the stoichiometric air-fuel ratio. Due to this, the $O_2$ storage amount of the three-way catalyst apparatus 1 is maintained at about half of the maximum storage amount and simultaneously the part of the exhaust downstream part of the three-way catalyst apparatus 1 still not raised to the catalyst activation temperature is raised in temperature well by burning the relatively large amounts of HC and CO. The amplitude of the fluctuating air-fuel ratio in this operation is made smaller the higher the temperature Td of the exhaust downstream end of the three-way catalyst apparatus 1 to keep the exhaust upstream part etc. of the three-way catalyst apparatus 1 already raised to the catalyst activation temperature from being excessively raised in temperature. At the time t4, the temperature Td of the exhaust downstream end of the three-way catalyst apparatus 1 also becomes the catalyst activation temperature T, that is, the three-way catalyst apparatus 1 as a whole becomes the catalyst activation temperature T or more, so the air-fuel ratio control at the time of startup for raising the temperature of the three-way catalyst apparatus 1 is stopped.

From the time t2 to t3, a certain operation was performed under a rich air-fuel ratio, but as shown by the broken line in FIG. 3, it is also possible to make the combustion air-fuel ratio gradually approach the stoichiometric air-fuel ratio from the rich air-fuel ratio at the time of switching from the lean air-fuel ratio and to set the rich air-fuel ratio at the time of switching and the change per unit time of the combustion air-fuel ratio so that when reaching the stoichiometric air-fuel ratio, the $O_2$ storage amount of the three-way catalyst apparatus 1 becomes about half of the maximum storage amount. In this control of the combustion air-fuel ratio, judgment of the elapsed time becomes unnecessary. In the operation under the rich air-fuel ratio from the time t2 to t3, the amount of HC and amount of CO supplied to the three-way catalyst apparatus 1 from the time t2 to t3 are important. When the amount of exhaust gas during this time is greater than or less than the amount of exhaust gas forming the standard for setting these values, the rich air-fuel ratio at the time of switching has to be changed to the lean side or rich side, the time t between the time t2 to t3 has to be shortened or lengthened, or the change per unit time of the combustion air-fuel ratio has to be increased or decreased.

In the flow chart shown in FIG. 2, the above-mentioned air-fuel ratio control was performed at the time of engine startup, but of course when it is judged that the cooling water temperature is high and the time is the time of restart right after the engine is stopped, the three-way catalyst apparatus 1 as a whole becomes the catalyst activation temperature, so the above-mentioned air-fuel ratio control does not have to be performed. Further, when it is judged that the cooling water temperature is abnormally low and the time is the time of startup at an extremely low temperature, the operation under the lean air-fuel ratio right after completion of engine startup becomes unstable, so the above-mentioned air-fuel ratio control can be foregone.

Further, in the present embodiment, the temperature TL at the position of the length L from the exhaust upstream end of the three-way catalyst apparatus 1 was estimated using at least the temperature Tc of the center of the three-way catalyst apparatus 1 in the longitudinal direction measured by the second temperature sensor 3, but it is also possible to estimate this without providing any temperature sensor based on an amount of energy for raising the temperature of the three-way catalyst apparatus 1 estimated from the temperature of the exhaust gas and flow rate of the exhaust gas flowing into the three-way catalyst apparatus 1 for each engine operating state and on the outside air temperature etc. Here, the three-way catalyst apparatus 1 is considered to have a temperature gradient gradually decreasing from the exhaust upstream end to the exhaust downstream end. The temperature Td of the exhaust downstream end of the three-way catalyst apparatus 1 may also be estimated without providing a temperature sensor based on the above-mentioned amount of energy and outside air temperature.

The invention claimed is:

1. An air-fuel ratio control device of an internal combustion engine characterized by making a combustion air-fuel ratio leaner than a stoichiometric air-fuel ratio at the time of engine startup and when it is judged that just an exhaust upstream part of a three-way catalyst apparatus arranged in an engine exhaust system has been raised to a catalyst activation temperature, making the combustion air-fuel ratio richer than the stoichiometric air-fuel ratio and raising a temperature of an exhaust downstream part of said three-way catalyst apparatus.

2. An air-fuel ratio control device of an internal combustion engine as set forth in claim 1 characterized in that a volume of said exhaust upstream part of said three-way catalyst apparatus, which makes the combustion air-fuel ratio lean to raise it to the catalyst activation temperature, is changed to become larger the greater the amount of exhaust gas at the time of engine startup.

3. An air-fuel ratio control device of an internal combustion engine as set forth in claim 1 characterized in that it is judged that just said exhaust upstream part has been raised to the catalyst activation temperature based on a measurement temperature of a center of said three-way catalyst apparatus in the longitudinal direction.

4. An air-fuel ratio control device of an internal combustion engine as set forth in claim 1 characterized in that when it is estimated that the O2 storage amount of the three-way catalyst apparatus 1 is reduced to a set amount due to the combustion air-fuel ratio being made richer than the stoichiometric air-fuel ratio, the combustion air-fuel ratio is made the stoichiometric air-fuel ratio.

5. An air-fuel ratio control device of an internal combustion engine as set forth in claim 1 characterized in that when it is estimated that the O2 storage amount of the three-way catalyst apparatus 1 is reduced to a set amount due to the combustion air-fuel ratio being made richer than the stoichiometric air-fuel ratio, the combustion air-fuel ratio is made to alternately fluctuate to the rich side and lean side from the stoichiometric air-fuel ratio.

6. An air-fuel ratio control device of an internal combustion engine as set forth in claim 5 characterized in that an amplitude of the fluctuation of the combustion air-fuel ratio is made smaller the higher the temperature of said exhaust downstream part of said three-way catalyst apparatus.

7. An air-fuel ratio control device of an internal combustion engine as set forth in claim 5 characterized in that a period of fluctuation of the combustion air-fuel ratio is made larger the higher the temperature of said exhaust downstream part of said three-way catalyst apparatus.

* * * * *